No. 636,235. Patented Nov. 7, 1899.
J. R. BALLARD.
THILL COUPLING.
(Application filed Mar. 25, 1899.)
(No Model.) 2 Sheets—Sheet 1.
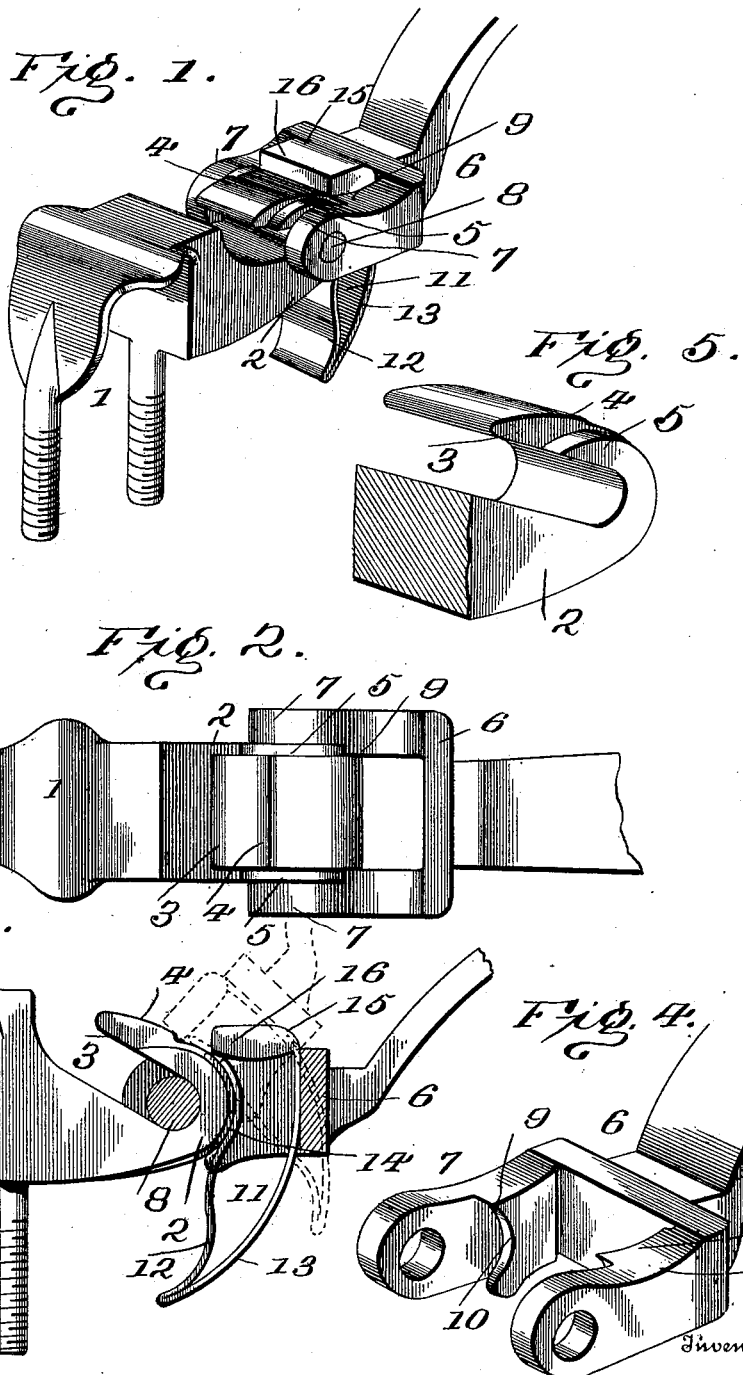
Witnesses
Inventor
John R. Ballard No. 636,235. Patented Nov. 7, 1899.
J. R. BALLARD.
THILL COUPLING.
(Application filed Mar. 25, 1899.)
(No Model.) 2 Sheets—Sheet 2.
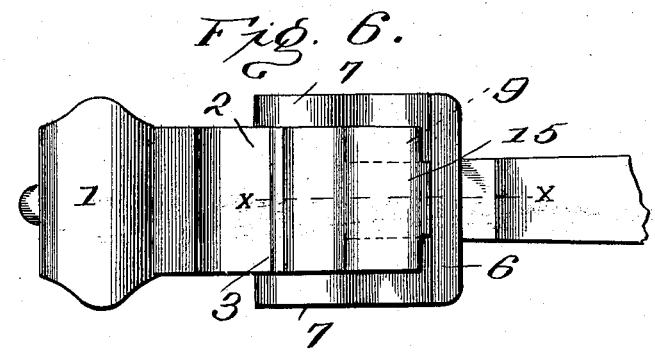
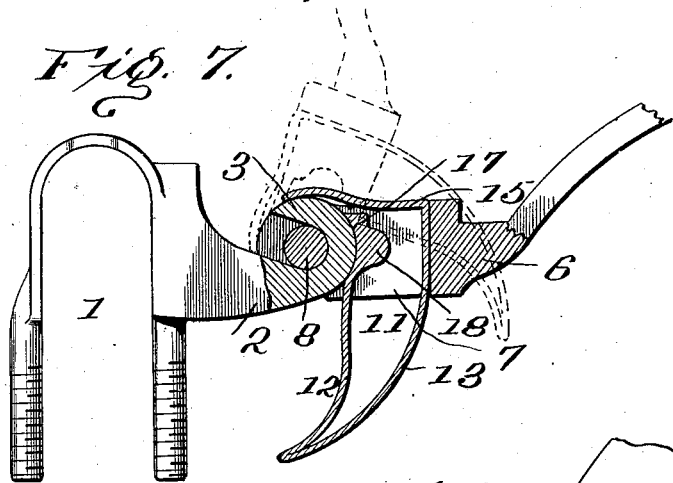
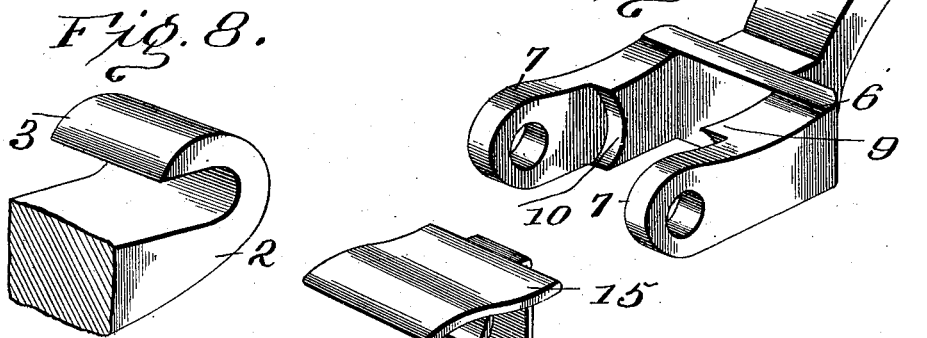
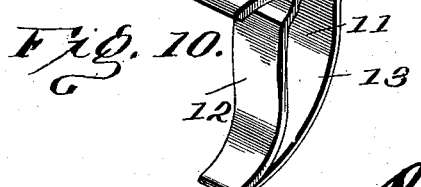
Witnesses
Inventor
John R. Ballard
by R. S. A. B. Lacey his Attorneys

UNITED STATES PATENT OFFICE.

JOHN R. BALLARD, OF WINFIELD, KANSAS.

THILL-COUPLING.

SPECIFICATION forming part of Letters Patent No. 636,235, dated November 7, 1899.

Application filed March 25, 1899. Serial No. 710,464. (No model.)

*To all whom it may concern:*

Be it known that I, JOHN R. BALLARD, a citizen of the United States, residing at Winfield, in the county of Cowley and State of Kansas, have invented certain new and useful Improvements in Thill-Couplings; and I do hereby declare the following to be a full, clear, and exact description of the invention, such as will enable others skilled in the art to which it appertains to make and use the same.

Couplings for attaching shafts or thills to the axle-clips of vehicles are of many varieties, and the present invention belongs to that class in which the thill-iron is formed at its attaching end with an eye and the axle-clip with a hook to receive and pass through the eye and enable ready attachment and detachment of the shafts or thills by a sliding movement.

This invention aims to prevent accidental uncoupling of the thills, to obviate a pounding of the coupling members, to guard against rattling, to centralize the draft on the hook, and to improve the general construction, whereby the efficiency of this type of devices is increased.

For a full understanding of the merits and advantages of the invention reference is to be had to the drawings hereto attached, in which—

Figure 1 is a perspective view of a thill-coupling embodying the essence of the invention. Fig. 2 is a top plan view, the spring being omitted. Fig. 3 is a side elevation, the near arm of the thill-iron being broken away and the dotted lines showing the manner of limiting the movement of the thills when turned into a vertical position. Fig. 4 is a detail view in perspective of the attaching end portion of the thill-iron. Fig. 5 is a detail view in perspective of the hook portion of the clip. Fig. 6 is a top plan view of a different embodiment of the invention. Fig. 7 is a longitudinal section on the line X X of Fig. 6, the dotted lines showing the manner of limiting the movement of the thills when thrown upward. Figs. 8, 9, and 10 are detail perspective views of the clip, thill-iron, and spring, respectively.

Corresponding and like parts are referred to in the following description and indicated in all the views of the drawings by the same reference characters.

The axle-clip 1 is of ordinary construction and is provided on its front side with a forwardly-extending hook 2, whose throat inclines upwardly and rearwardly. The inner end of the hook is centrally disposed, so as to equalize the strain upon the upper and lower parts thereof. The bill 3 of the hook is straight and inclines upwardly and rearwardly and is provided upon its top side with a shoulder or offset 4, constituting a stop to act jointly with the bent end portion of the spring and limit the movement of the thills when thrown upward into an approximately vertical position. The marginal or side portions of the hook are cut away, forming rounded portions 5, which provide clearance for the inner cheek-pieces of the arms of the thill-iron when the latter is turned into a position to admit of it being coupled to the hook 2 or detached therefrom.

The thill-iron 6 has its lower or rear end bifurcated, forming arms 7, which are connected at their free ends by the transverse pin 8, the arms and pin forming an eye to receive the hook 2 when the parts are coupled. The pin 8 may be applied to or formed with the arms 7 and is round in cross-section to provide a pintle for the thill-iron to turn upon when in engagement with the hook 2. The cheek-pieces 9 project toward each other from the inner or forward ends of the arms 7, and their rear edges are concave, as shown at 10, to conform to the rounded end of the hook 2 and bear thereagainst. These cheek-pieces are of a width corresponding to the transverse extent of the rounded marginal portions 5 and clear the latter when removing the thill-iron or placing it in position. The parts are so proportioned that the concave ends 10 of the cheek-pieces engage with the rounded end of the hook 2 when the thill-iron is in position, so as to prevent longitudinal play thereof and accidental uncoupling of the parts.

A spring 11 is fitted into the space formed between the forward end of the hook 2 and the inner wall of the eye of the thill-iron opposite thereto, and this spring is composed of members 12 and 13, which are joined at their lower ends and diverge toward their upper or free ends. The lower portion of the spring 11 curves rearwardly, so as to be out of the way, and the outer end portion of the rear member 12 is curved forwardly, as shown at 14, to snugly fit against the front end of the hook 2 and secure the spring from accidental displacement when properly positioned. The upper end of the member 13 is bent rearwardly, as shown at 15, and overhangs the space formed between the upper ends of the members 12 and 13 and closes the portion of the eye into which the spring is thrust. The rear end of the bent portion 15 is adapted to engage with the shoulder 4 and limit the upward movement of the thills when turned into an approximately-vertical position, thereby preventing the accidental uncoupling of the shafts when turned out of the way. The bent-end portion 15 is reinforced by having a block 16 applied thereto, said reinforcement 16 being formed with or attached to the spring. The spring 11 exerts a pressure against the end of the hook 2 and a portion of the thill-iron opposite the hook to hold the pin 8 close against the inner end of the hook, thereby preventing rattling and automatically compensating for wear between the parts when the device is in active operation. The spring 11 besides serving as an antirattler acts in the capacity of a lock to prevent the uncoupling of the thills so long as the spring is in position. When it is required to disconnect the thills from the axle-clip, the spring 11 must first be removed. This is effected by upward pressure against the lower end of the spring or by striking the spring a smart blow sufficient to disengage the seat portion 14 from the curved end of the hook 2.

In the form shown in Fig. 6 and the detail views thereof the bill portion of the hook is shortened and made rounding upon its outer side to conform with the curved end of the hook. The shoulder or offset 4 is dispensed with, and the rounded marginal portions 5 are omitted, the bill and shank portions being of uniform thickness throughout their lateral extent. The upper end of the spring member 12 is thickened, as shown at 17, and the rear face of the thickened end portion is made hollow or concave to receive the rounded end of the hook 2. The rearwardly-bent end portion 15 of the front member 13 is curved to conform to the combined outline of the bill portion of the hook and the upper ends of the cheek-pieces and is of a lateral extent to overlap the said cheek-pieces 9 and close the upper side of the eye or space formed between the arms 7 and pin 8. In order to prolong the usefulness of the spring 11 and prevent its members from losing their resiliency, it has been found expedient to interpose a stop 18 between the free end portions of the members 12 and 13. This stop may be applied to either of the members and may constitute an integral part thereof or be separate from and attached thereto. The best results are attained by applying the stop to the thickened portion 17 of the member 12, as it can be formed as a part of the said thickened end portion. In all other respects the coupling is substantially the same as that previously described and operates in substantially the same manner. The bent end portion 15 of the spring passes by the bill of the hook and engages with the shank portion of the said hook when the thills are thrown upward and limits their movement and prevents them from being uncoupled.

From the foregoing it will be readily understood that various changes in the form, proportion, and minor details of construction may be resorted to without departing from the spirit of the invention or sacrificing any of the advantages thereof.

Having thus described the invention, what is claimed as new is—

1. In a thill-coupling, an axle-clip having a forwardly-extending hook, a thill-iron having its attaching end formed with an eye to receive the said hook, and having cheek-pieces projecting inwardly from the side members of the eye with their rear edges made hollow or concave to overlap and fit against the curved end of the said hook, and a spring fitted into the forward end portion of the said eye and between the cheek-pieces and exerting a pressure against the hook and thill-iron to maintain these parts in close relation and obviate rattling, substantially as set forth.

2. In a thill-coupling, an axle-clip provided with a forwardly-extending hook, a thill-iron having an eye at its attaching end to receive the said hook and provided with inwardly-extending cheek-pieces having their rear ends made hollow or concave to conform to the curved end of the hook, and a spring fitted into the front end portion of the said eye and between the cheek-pieces and having a rearwardly-extending portion to make positive engagement with the hook and limit the movement of the thills when thrown upward, substantially as and for the purpose set forth.

3. In a thill-coupling, a hook having an outer shoulder or stop upon its bill, and having its marginal portions cut away and made rounding, a thill-iron having an eye at its attaching end to receive the said hook and formed with inwardly-extending cheek-pieces having their rear edges about equal in lateral extent to the width of the said rounded marginal portions of the hook and made hollow or concave to correspond with and bear against the said marginal portions for the purpose described, and a spring fitted into the forward portion of the said eye between the cheek-pieces and constructed to prevent uncoupling of the parts by engagement with the aforesaid shoulder or stop and adapted to compensate for wear and prevent rattling, substantially as described.

In testimony whereof I affix my signature in presence of two witnesses.

JOHN R. BALLARD. [L. S.]

Witnesses:
J. W. OLDS,
L. A. JACOBUS.